United States Patent
Holmbacka

(10) Patent No.: US 12,309,692 B2
(45) Date of Patent: May 20, 2025

(54) ENERGY SAVING MANAGEMENT IN COMMUNICATION NETWORKS

(71) Applicant: Elisa Oyj, Helsinki (FI)

(72) Inventor: Simon Holmbacka, Helsinki (FI)

(73) Assignee: Elisa Oyj, Helsinki (FI)

( * ) Notice: Subject to any disclaimer, the term of this patent is extended or adjusted under 35 U.S.C. 154(b) by 451 days.

(21) Appl. No.: 17/793,202

(22) PCT Filed: Feb. 1, 2021

(86) PCT No.: PCT/FI2021/050063
§ 371 (c)(1),
(2) Date: Jul. 15, 2022

(87) PCT Pub. No.: WO2021/156539
PCT Pub. Date: Aug. 12, 2021

(65) Prior Publication Data
US 2023/0073178 A1    Mar. 9, 2023

(30) Foreign Application Priority Data
Feb. 5, 2020 (FI) .................................. 20205118

(51) Int. Cl.
*H04B 7/185* (2006.01)
*H04W 52/02* (2009.01)

(52) U.S. Cl.
CPC ............. *H04W 52/0206* (2013.01)

(58) Field of Classification Search
CPC .............................................. H04W 52/0206
(Continued)

(56) References Cited

U.S. PATENT DOCUMENTS 6,584,330 B1   6/2003  Ruuska
8,838,177 B2   9/2014  Lin et al.
(Continued)

FOREIGN PATENT DOCUMENTS

EP    2566255 A1    3/2013
EP    2787777 A1    10/2014
(Continued)

OTHER PUBLICATIONS

Finnish Patent and Registration Office, Search Report, Application No. 20205118, mailed Feb. 9, 2020, 2 pages.
(Continued)

*Primary Examiner* — Temica M Beamer
(74) *Attorney, Agent, or Firm* — Ziegler IP Law Group, LLC.

(57) ABSTRACT

A computer implemented method of energy saving management for a source cell in a communication network. The method includes obtaining performance data of the source cell and a plurality of neighbor cells; determining and feeding input variable values to an energy saving management function based on the performance data and network topology of the communication network, wherein the input variables comprise variables representative of: 1) Overlap between the source cell and the neighbor cells, 2) Neighbor cell throughput, and 3) Source cell throughput; wherein the energy saving management function provides output based on combination of the input variables. Energy saving mode for the source cell is determined based on the output of the energy saving management function.

15 Claims, 3 Drawing Sheets

(58) Field of Classification Search
USPC .......................................................... 370/318
See application file for complete search history.

(56) References Cited

U.S. PATENT DOCUMENTS

| | | |
|---|---|---|
| 2014/0050135 A1 | 2/2014 | Zhang et al. |
| 2015/0188792 A1 | 7/2015 | Sanneck et al. |
| 2019/0349773 A1 | 11/2019 | Mwanje et al. |
| 2020/0351892 A1* | 11/2020 | Yi .......................... H04L 5/0092 |
| 2021/0243763 A1* | 8/2021 | Zhou ..................... H04W 72/23 |

FOREIGN PATENT DOCUMENTS

| | | |
|---|---|---|
| EP | 2613593 A4 | 1/2015 |
| EP | 2919531 A1 | 9/2015 |
| WO | 2017100826 A1 | 6/2017 |
| WO | 2018006925 A1 | 1/2018 |
| WO | 2018102127 A1 | 6/2018 |
| WO | 2020018008 A1 | 1/2020 |

OTHER PUBLICATIONS

International Search Report and Written Opinion, European Patent Office, Application No. PCT/FI2021/050063, mailed Apr. 26, 2021, 15 pages.

* cited by examiner

ENERGY SAVING MANAGEMENT IN COMMUNICATION NETWORKS

TECHNICAL FIELD

The present application generally relates to energy saving management in communication networks.

BACKGROUND

This section illustrates useful background information without admission of any technique described herein representative of the state of the art.

Communication networks comprise a plurality of cells serving users of the network. As the load in the network increases, new cells are deployed to increase capacity of the network. This results in increased energy consumption.

On the other hand, there is a constant desire to minimize energy consumption. For example, advanced chip technology, data center optimization, and power save modes are employed in communication networks in order to reduce energy consumption.

Now a new approach is provided for managing energy saving in communication networks.

SUMMARY

Various aspects of examples of the invention are set out in the claims. Any devices and/or methods in the description and/or drawings which are not covered by the claims are examples useful for understanding the invention.

According to a first example aspect of the present invention, there is provided a computer implemented method of f energy saving management for a source cell in a communication network. The method comprises
  obtaining performance data of the source cell and a plurality of neighbor cells;
  determining and feeding input variable values to an energy saving management function based on the performance data and network topology of the communication network, wherein the input variables comprise variables representative of:
    Overlap between the source cell and the neighbor cells,
    Neighbor cell throughput, and
    Source cell throughput,
  wherein the energy saving management function provides output based on combination of the input variables, the method further comprising
  determining energy saving mode for the source cell based on the output of the energy saving management function.

In an example embodiment, value of at least one of the input variables represents an average value.

In an example embodiment, value of at least one of the input variables represents a selected percentile.

In an example embodiment, values of the input variables comprise values representative of the following:
  Average overlap between the source cell and the neighbor cells,
  Average neighbor cell throughput,
  Minimum neighbor cell throughput, and
  Source cell throughput.

In an example embodiment, the determined energy saving mode is one of the following: no shutdown, shutdown according to default plan, shutdown according to cell specific plan.

In an example embodiment, the determined energy saving mode is no shutdown or shutdown according to default plan, when the output of the energy saving management function indicates high neighborhood impact.

In an example embodiment, the determined energy saving mode is shutdown according to default plan or shutdown according to cell specific plan, when the output of the energy saving management function indicates low neighborhood impact.

In an example embodiment, the determined energy saving mode is shutdown according to default plan, when the output of the energy saving management function indicates mediocre neighborhood impact.

In an example embodiment, the method further comprises outputting the energy saving mode.

In an example embodiment, the energy saving management function is implemented in fuzzy logic.

In an example embodiment, the source cell and the neighbor cells operate on the same frequency band.

In an example embodiment, the source cell and at least some of the neighbor cells operate on different frequency bands.

According to a second example aspect of the present invention, there is provided an apparatus comprising a processor and a memory including computer program code; the memory and the computer program code configured to, with the processor, cause the apparatus to perform the method of the first aspect or any related embodiment.

According to a third example aspect of the present invention, there is provided a computer program comprising computer executable program code which when executed by a processor causes an apparatus to perform the method of the first aspect or any related embodiment.

The computer program of the third aspect may be a computer program product stored on a non-transitory memory medium.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Example embodiments of the present invention and its potential advantages are understood by referring to FIGS. 1 through 4 of the drawings. In this document, like reference signs denote like parts or steps.

The load in communication networks is not constant. The load in different cells varies e.g. depending on movements of the users and time of the day. For example, during nighttime some cells of the network may have very little or no load at all, but the cells consume energy also during such low-load periods. In order to save energy some of the cells may be temporarily shut down during low load periods. Present disclosure provides proactive determination of suitable shut down schedules for different cells.

In many implementations cell shutdown is determined based on load and performance of the cell or perhaps based on load and performance in the cells of the same sector. However, shutting down a cell may have significant effects of surrounding network neighborhood as other cells will try to cover the area that was served by the cell that was shut down. Example embodiments of the invention provide that also surrounding network neighborhood is taken into account in connection with or prior to scheduling shutdown of a cell. This is provided by taking into account degree of overlap of coverage areas of neighboring cells in combination with information about load in the cells.

In this document, shutting down a cell refers to fully or partially shutting down the cell. Partial shutdown may be implemented by shutting down one or more MIMO (multiple input multiple output) antenna branches in the cell. By partial shutdown the cell does not fully disappear from the network but continues to provide service to a smaller area and/or on lower speed or throughput. In this way, disturbance caused by the cell shutdown to the neighborhood is reduced.

Figure 1:
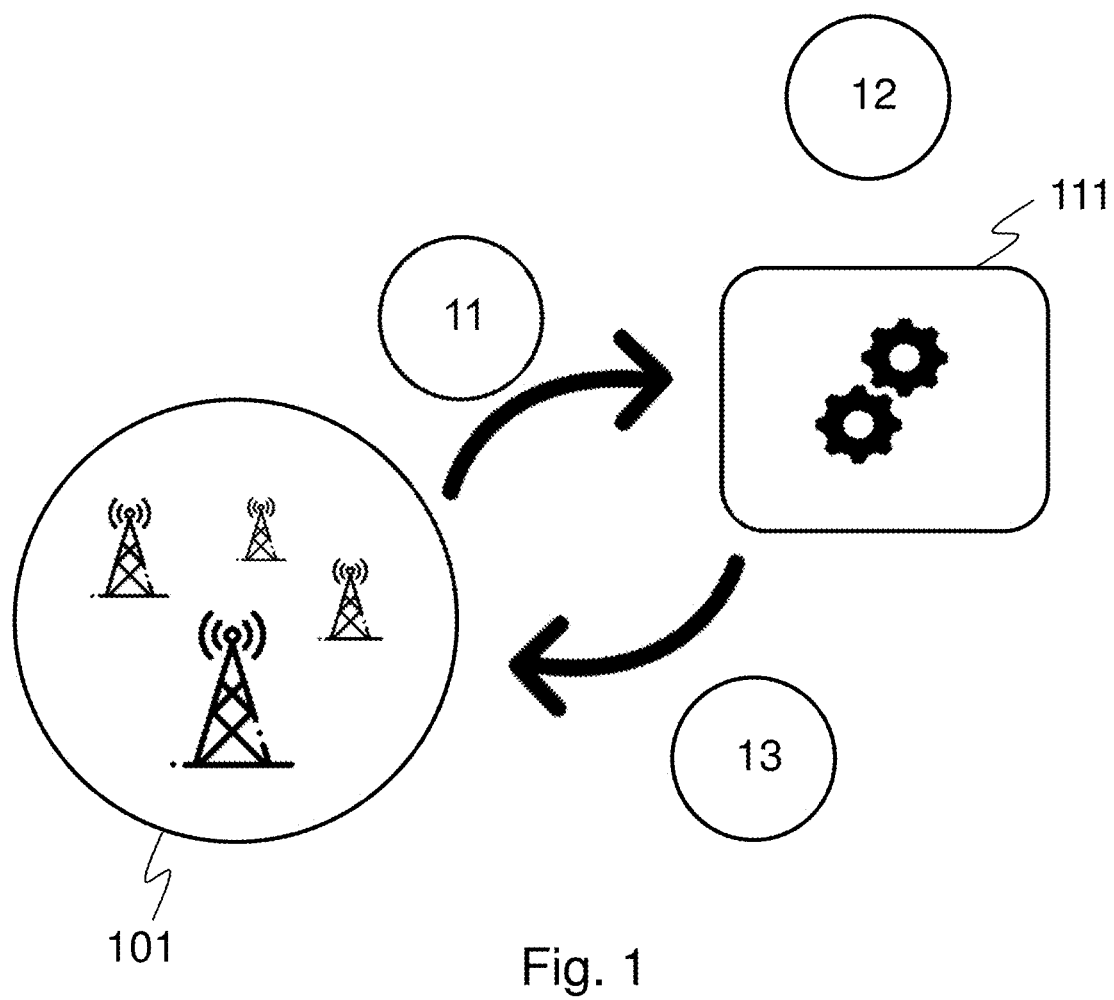
FIG. 1 shows an example scenario according to an embodiment.

FIG. 1 shows an example scenario according to an embodiment. The scenario shows a communication network 101 comprising a plurality of cells and base stations and other network devices, and an automation system 111 configured to implement automatic energy saving management process according to example embodiments. The automation system may additionally implement scheduling of cell shutdown periods based on results of the energy saving management process.

In an embodiment of the invention the scenario of FIG. 1 operates as follows: In phase 11, the automation system 111 obtains performance data from cells of the network. The performance data that is collected comprises at least data that provides throughput of the cells and may comprise for example one or more of the following: Datavolume, Number of users, PRB (physical resource block), TA (timing advance), RSRP (reference signal received power), HO (handover) attempt, and other available performance data. It is to be noted that the names used for the performance data may vary depending on the network technology and the vendor of the devices that are being used.

The performance data may concern performance over a period of time. The period of time may be for example 1 day, 2-5 days, 1 week, 2 weeks, 3 weeks, one month, or some other period of time.

Additionally, the automation system 111 may obtain information about network topology (comprising e.g. cell locations and antenna directions) unless such information is already available in the automation system. The information of the network topology may be obtained e.g. from network design systems.

In phase 12, the automation system 111 uses the performance data and the network topology to run an energy saving management function and to determine energy saving mode for one or more cells of the communication network 101. Based on the determined energy saving mode shutdown periods, if any, are scheduled for one or more cells of the communication network 101.

In phase 13, the scheduled shutdown periods are taken into use in the cells of the communication network 101.

The process may be manually or automatically triggered. Additionally or alternatively, the process may be periodically repeated. The process may be repeated for example once a week, every two weeks, once a month, or every 2-5 months. By periodically repeating the process, the energy saving management process automatically adapts to changes in the network.

Figure 2:
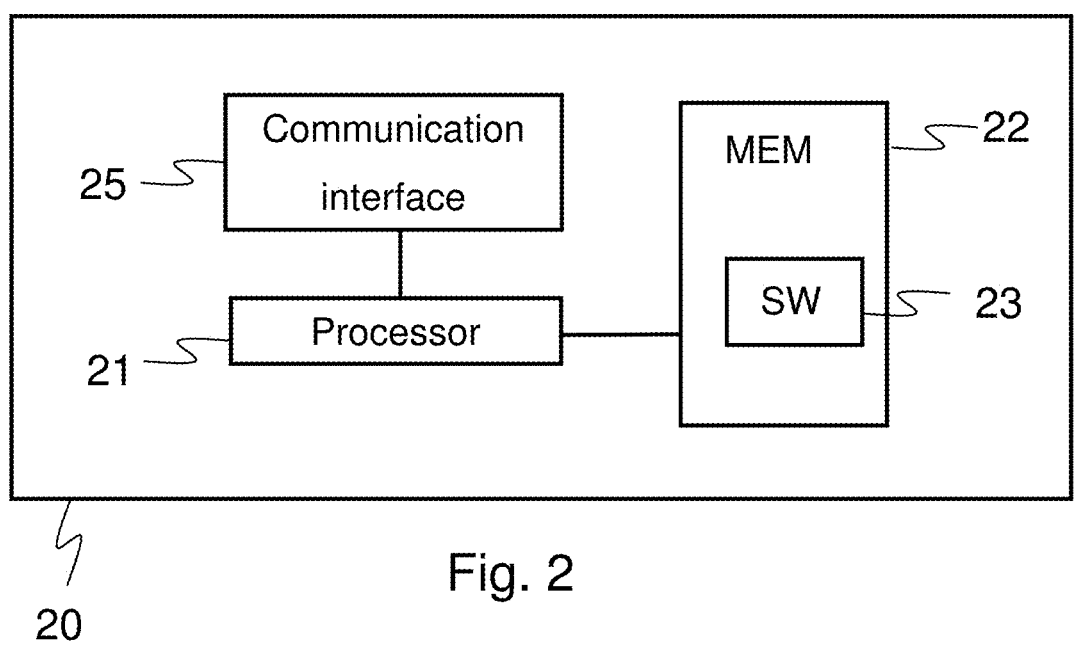
FIG. 2 shows an apparatus according to an embodiment.

FIG. 2 shows an apparatus 20 according to an embodiment. The apparatus 20 is for example a general-purpose computer or server or some other electronic data processing apparatus. The apparatus 20 can be used for implementing embodiments of the invention. That is, with suitable configuration the apparatus 20 is suited for operating for example as the automation system 111 of foregoing disclosure.

The general structure of the apparatus 20 comprises a processor 21, and a memory 22 coupled to the processor 21. The apparatus 20 further comprises software 23 stored in the memory 22 and operable to be loaded into and executed in the processor 21. The software 23 may comprise one or more software modules and can be in the form of a computer program product. Further, the apparatus 20 comprises a communication interface 25 coupled to the processor 21.

The processor 21 may comprise, e.g., a central processing unit (CPU), a microprocessor, a digital signal processor (DSP), a graphics processing unit, or the like. FIG. 2 shows one processor 21, but the apparatus 20 may comprise a plurality of processors.

The memory 22 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 20 may comprise a plurality of memories.

The communication interface 25 may comprise communication modules that implement data transmission to and from the apparatus 20. The communication modules may comprise, e.g., a wireless or a wired interface module. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as Ethernet or universal serial bus (USB), for example. Further the apparatus 20 may comprise a user interface (not shown) for providing interaction with a user of the apparatus. The user interface may comprise a display and a keyboard, for example. The user interaction may be implemented through the communication interface 25, too.

A skilled person appreciates that in addition to the elements shown in FIG. 2, the apparatus 20 may comprise other elements, such as displays, as well as additional circuitry such as memory chips, application-specific integrated circuits (ASIC), other processing circuitry for specific purposes and the like. Further, it is noted that only one apparatus is shown in FIG. 2, but the embodiments of the invention may equally be implemented in a cluster of shown apparatuses.

Figure 3:
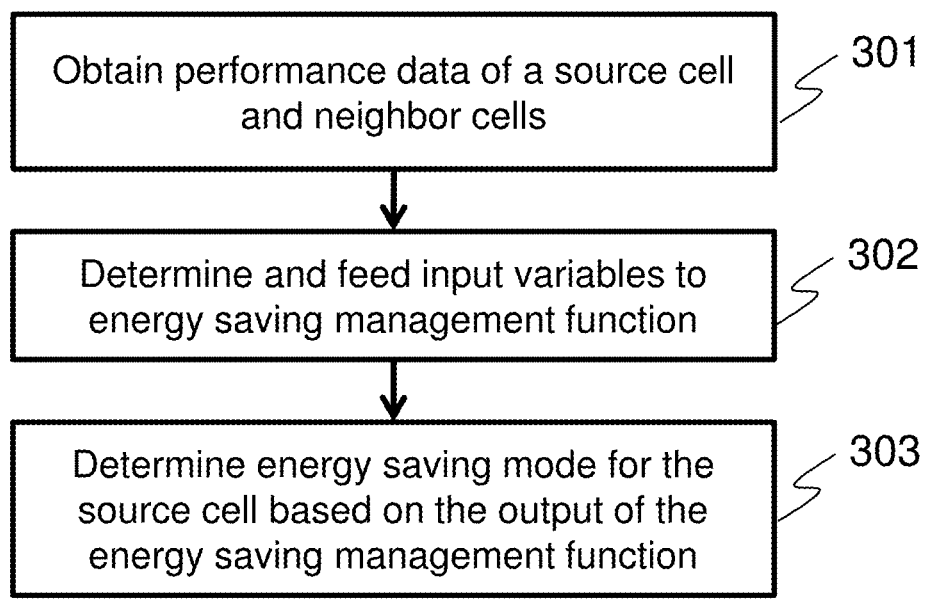
FIG. 3 shows a flow diagram illustrating example methods according to certain embodiments.

FIG. 3 shows a flow diagram illustrating example methods according to certain embodiments. The methods may be implemented in the automation system 111 of FIG. 1 and/or in the apparatus 20 of FIG. 2. The methods are implemented in a computer and do not require human interaction unless otherwise expressly stated. It is to be noted that the methods may however provide output that may be further processed by humans and/or the methods may require user input to start. Different phases shown in FIG. 3 may be combined with each other and the order of phases may be changed except where otherwise explicitly defined. Furthermore, it is to be noted that performing all phases of the flow charts is not mandatory.

The method of FIG. 3 provides energy saving management for a source cell in a communication network, and comprises following phases:

Phase 301: Performance data is obtained. The performance data relates to a source cell and a plurality of neighbor cells. Additionally, information about network topology (comprising e.g. cell locations and antenna directions) may be obtained unless such information is already available. The information of the network topology may be obtained e.g. from network design systems.

Phase 302: Input variables are determined and fed to an energy saving management function. The input variables are determined based on the performance data and the network topology. The energy saving management function provides output based on combination of the input variables.

Phase 303: Energy saving mode for the source cell is determined based on the output of the energy saving management function.

The method of FIG. 3 may further comprise outputting the determined energy saving mode and/or using the determined energy saving mode to schedule cell shutdown periods, if any, for the source cell.

The input variables, the output of the energy saving management function and the energy saving modes are discussed in more detail in the following.

In an embodiment, the input variables comprise variables representative of:
  Overlap between the source cell and the neighbor cells,
  Neighbor cell throughput, and
  Source cell throughput.

In general, the input variables shall provide information about overlap between the source cell and the neighbor cells, about neighbor cell throughput and about source cell throughput in some format. The input variables may comprise average values, values representing a selected percentile, minimum selected from a plurality of values, combinations of these etc. For example, $90^{th}$ percentile overlap between the source cell and the neighbor cells and/or $90^{th}$ percentile of neighbor/source cell throughput may be considered. As an alternative to the $90^{th}$ percentile, some other values may be used, such as $80^{th}$, $85^{th}$ or $95^{th}$ percentile. Additionally or alternatively, average of values over plurality of neighbor cells may be given as an input to the energy saving management function. The average may be taken over values representing a selected percentile. Additionally or alternatively, minimum neighbor cell throughput or two lowest values of neighbor cell throughput may be given as an input to the energy saving management function. Clearly these are just example implementations and other combinations may be applied.

In an embodiment, the input variables comprise values representative of:
  Average overlap between the source cell and the neighbor cells,
  Average neighbor cell throughput,
  Minimum neighbor cell throughput, and
  Source cell throughput.

In an embodiment, the input variables comprise values representative of:
  Average overlap between the source cell and the neighbor cells,
  Average or minimum neighbor cell throughput, and
  Source cell throughput.

The value for the overlap between the source cell and the neighbor cells may be based on information about network topology, such as distance between cells, antenna directions of the cells and/or coverage areas of the cells.

The neighbor cells that are considered may be chosen based on information about distance between the cells and/or neighbor lists. Also antenna directions of the cells and/or coverage areas of the cells may be taken into account to choose the closest or most relevant neighbor cells. For example, 5-15 closest or most relevant neighbor cells may be chosen for the analysis. In an example embodiment, 10 neighbors are chosen for the analysis. In an embodiment, the source cell and the neighbor cells operate on the same frequency band. Alternatively, least some of the neighbor cells may operate on different frequency band compared to the source cell.

In an example embodiment, the throughput variables (i.e. input variables relating to the throughput) may receive values between 0-50 megabits per second and the overlap variables (i.e. input variables relating to the overlap) may receive values between 0-1. These are however only example value ranges and other ranges may be equally applied.

In an example embodiment, the output of the energy saving management function may receive values between 0-17.5. Other ranges may be equally applied, though.

The determined energy saving mode may be one of the following: no shutdown, shutdown according to default plan, shutdown according to cell specific plan.

No shutdown refers to a mode, where the source cell is not shut down at all for energy saving purposes. Shutdown according to default plan refers to scheduling cell shutdown for the source cell during default hours, such as e.g. between 1 am and 6 am. During this time there is usually less traffic than during daytime. Shutdown according to cell specific plan refers to scheduling cell shutdown for the source cell according to individual plan, which may result in extended or different shutdown hours compared to the default plan. Shutdown periods of the cell specific plan may be continuously optimized on cell level. For example, cell shutdown period for a particular source cell may be scheduled based on network usage profile in cells serving overlapping the geographical area served by the source cell. The shutdown period for the source cell is scheduled for example based on load of one or more other cells that serve at least partially the same geographical area with the source cell. Also other cell specific shutdown scheduling methods may be used.

In an embodiment, the determined energy saving mode is no shutdown or shutdown according to default plan, when the output of the energy consumption management function indicates high neighborhood impact. High neighborhood impact refers to a situation where shutting down the source cell will have relatively high influence on performance of other cells in the neighborhood and/or where the other cells in the neighborhood have limited possibility to compensate for the shutdown of the source cell. For example, in a situation where performance in the other cells in the neighborhood is not very good, the other cells in the neighborhood have limited possibility to take over load from the source cell. Additionally or alternatively, the determined energy saving mode may be shutdown according to default plan or shutdown according to cell specific plan, when the output of the energy consumption management function indicates low neighborhood impact. Low neighborhood impact refers to a situation where shutting down the source cell will have less influence on performance of other cells in the neighborhood and/or where the other cells in the neighborhood are able to compensate for the shutdown of the source cell. For example, in a situation where performance in the other cells in the neighborhood is relatively good, the other cells in the neighborhood are likely able to take over load from the source cell. In this way, maximum energy saving is used when neighborhood impact is low, and when neighborhood impact is high, less energy saving is used to ensure proper service for the users of the network.

In an embodiment, minimum output value (e.g. 0) of the energy consumption management function represents highest neighborhood impact and is determined to match energy saving mode: no shutdown. Maximum output value (e.g. 17.5) of the energy consumption management function may represent lowest neighborhood impact and may be determined to match energy saving mode: shutdown according to default plan. Average output value (e.g. 8.75) of the energy consumption management function may represent mediocre neighborhood impact and may be determined to match energy saving mode: shutdown according to cell specific plan. Output values between the minimum, maximum and average are flexibly determined to match for example closest energy saving mode.

Figure 4:
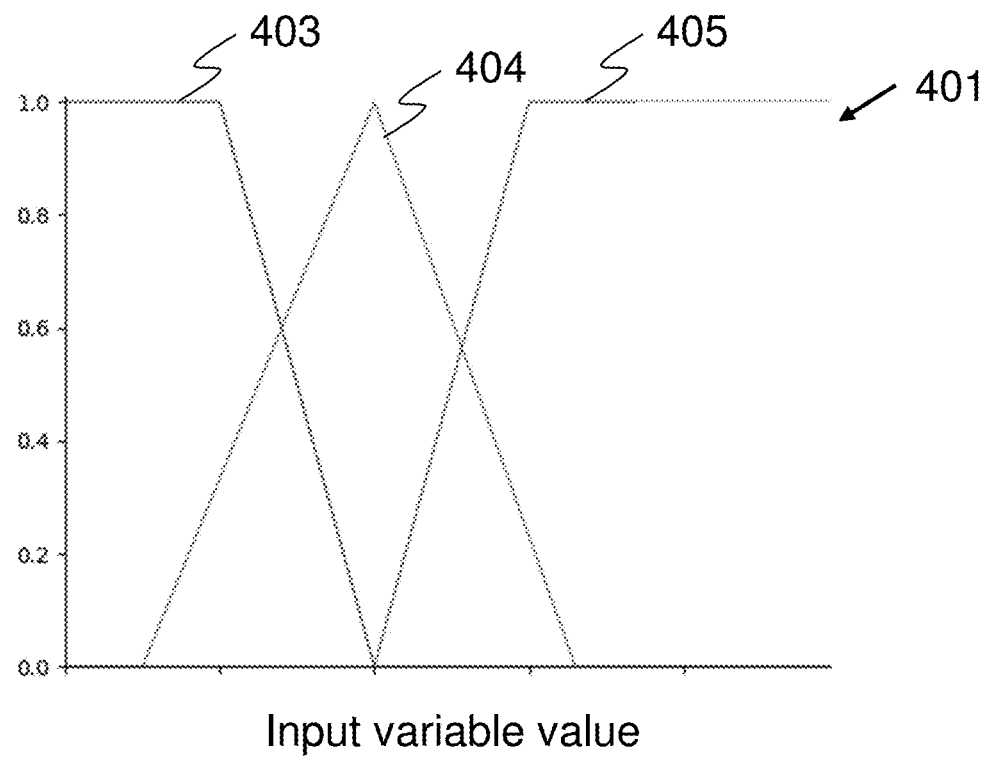
FIG. 4 illustrates operation of an example energy saving management function.
Figure 4:
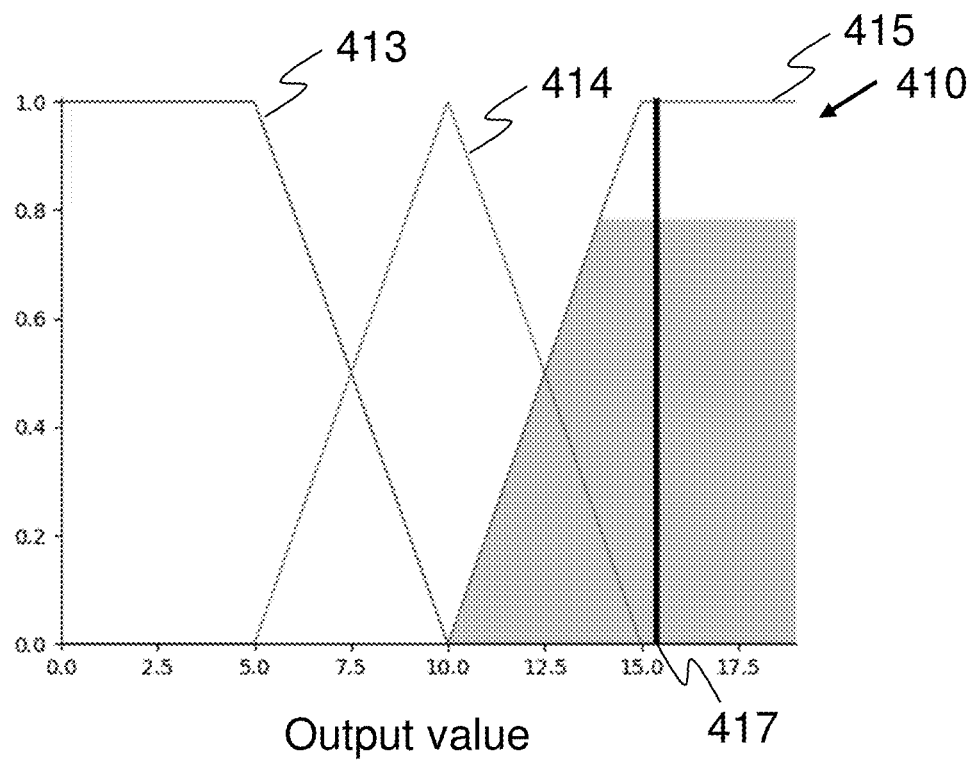

In an embodiment, the energy consumption management function is implemented in fuzzy logic. FIG. 4 illustrates operation of an example fuzzy logic implementation of the energy saving management function.

In the example of FIG. 4, the input variables are classified with membership functions to low, medium or high state. The states of the input variables are used to determine state of the output and thereby the energy saving mode. The state of the output is no shutdown, shutdown according to default plan, shutdown according to cell specific plan. FIG. 4 shows a graph 401 illustrating an example membership function and a graph 410 illustrating an example of output states. X-axis of the graph 401 is the value of the input variable and y-axis gives value indicating degree of membership in the states low, medium and high for different input variable values. Line 403 defines degree of membership in state low, line 404 defines degree of membership in state medium and line 405 defined degree of membership in state high.

The membership values of the different input variable values are combined to define output state. X-axis of the graph 410 shows the output value of the fuzzy logic function and y-axis gives value indicating degree of membership in the states no shutdown, shutdown according to default plan, shutdown according to cell specific plan for different output values. Line 413 defines degree of membership in state no shutdown, line 414 defines degree of membership in state shutdown according to default plan and line 415 defines degree of membership in state shutdown according to cell specific plan.

Line 417 shows one example output value 15.4 which is matched to state shutdown according to cell specific plan.

In an example embodiment, the energy saving management function may be set to operate as follows in a setting where input variables of the energy saving management function are overlap between the source cell and the neighbor cells, average neighbor cell throughput, minimum neighbor cell throughput and source cell throughput:

when overlap is mainly low or medium, average neighbor cell throughput is mainly medium or high, and source cell throughput is mainly high, the output state (and the energy saving mode) is shutdown according to cell specific plan;

when overlap is mainly low or medium, minimum neighbor cell throughput is mainly medium or high, and source cell throughput is mainly high, the output state (and the energy saving mode) is shutdown according to cell specific plan;

when average or minimum neighbor cell throughput is mainly low, and overlap is mainly medium or high, the output state (and the energy saving mode) is no shutdown;

when source cell throughput is mainly low, the output state (and the energy saving mode) is no shutdown;

when minimum neighbor cell throughput is mainly low, average neighbor cell throughput is mainly high, and overlap is mainly medium or high, the output state (and the energy saving mode) is shutdown according to default plan;

when minimum neighbor cell throughput is mainly low, average neighbor cell throughput is mainly medium or high, and overlap is mainly low, the output state (and the energy saving mode) is shutdown according to cell specific plan.

Present disclosure provides mechanisms to determine what kind of energy saving mode is suitable for each cell, i.e. whether shutdown of the cell should be prohibited, whether default shut down hours should be applied in the cell, or whether the cell could be shutdown according to individual plan possibly resulting in extended shutdown hours or at least in shut down hours that differ from the default plan. Without in any way limiting the scope, interpretation, or application of the claims appearing below, a technical effect of one or more of the example embodiments disclosed herein is that neighborhood effects can be taken into account in energy saving actions.

Another technical effect of one or more of the example embodiments disclosed herein is improved user experience as less energy saving actions are used in neighborhoods, where cell shutdown may have significant effect of quality of service.

Another technical effect of one or more of the example embodiments disclosed herein is that energy saving may be increased without deteriorating user experience, as energy saving actions may be targeted to neighborhoods, where cell shutdown is likely to have less effect of quality of service.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications, which may be made without departing from the scope of the present invention as defined in the appended claims.

The invention claimed is:

1. A computer implemented method of energy saving management for a source cell in a communication network, the method comprising:

obtaining performance data of the source cell and a plurality of neighbor cells;
determining and feeding input variable values to an energy saving management function based on the performance data and a network topology of the communication network, wherein the input variable values comprise variables representative of:
an overlap between the source cell and the plurality of neighbor cells,
a neighbor cell throughput, and
a source cell throughput,
wherein the energy saving management function provides an output based on a combination of the input variable values, the method further comprising:
determining an energy saving mode for the source cell based on the output of the energy saving management function, wherein the determined energy saving mode is selected from a group comprising at least the following three alternatives:
no shutdown, wherein the source cell is not shut down at all for energy saving purposes;
a shutdown according to a default plan, wherein the source cell is scheduled for shutdown during default hours; and
a shutdown according to a cell specific plan, wherein the source cell is scheduled for shutdown according to an individual plan.

2. The method of claim 1, wherein a value of at least one of the input variable values represents an average value.

3. The method of claim 1, wherein a value of at least one of the input variable values represents a selected percentile.

4. The method of claim 1, wherein values of the input variable values comprise values representative of the following:
an average overlap between the source cell and the neighbor cells,
an average neighbor cell throughput,
a minimum neighbor cell throughput, and
a source cell throughput.

5. The method of claim 1, wherein the determined energy saving mode is no shutdown or shutdown according to the default plan, when the output of the energy saving management function indicates high neighborhood impact.

6. The method of claim 1, wherein the determined energy saving mode is shutdown according to the default plan or shutdown according to the cell specific plan, when the output of the energy saving management function indicates low neighborhood impact.

7. The method of claim 1, wherein the input value variables comprise values representative of: the overlap between the source cell and the neighbor cells, an average neighbor cell throughput, a minimum neighbor cell throughput and the source cell throughput, and the energy saving management function is a membership function having states low, medium and high,
wherein the energy saving mode is determined according to the following rules:
when the overlap is mainly low or medium, the average neighbor cell throughput is mainly medium or high, and the source cell throughput is mainly high, the energy saving mode is shutdown according to the cell specific plan;
when the overlap is mainly low or medium, the minimum neighbor cell throughput is mainly medium or high, and the source cell throughput is mainly high, the energy saving mode is shutdown according to the cell specific plan;
when the average neighbor cell throughput or the minimum neighbor cell throughput is mainly low, and the overlap is mainly medium or high, the energy saving mode is no shutdown;
when the source cell throughput is mainly low, the energy saving mode is no shutdown;
when the minimum neighbor cell throughput is mainly low, the average neighbor cell throughput is mainly high, and the overlap is mainly medium or high, the energy saving mode is shutdown according to the default plan;
when the minimum neighbor cell throughput is mainly low, the average neighbor cell throughput is mainly medium or high, and the overlap is mainly low, the energy saving mode is shutdown according to the cell specific plan.

8. The method of claim 1, further comprising outputting the energy saving mode.

9. The method of claim 1, wherein the energy saving management function is implemented in fuzzy logic.

10. The method of claim 1, wherein the source cell and the plurality of neighbor cells operate on a same frequency band.

11. The method of claim 1, wherein the source cell and at least some of the plurality of neighbor cells operate on different frequency bands.

12. An apparatus comprising:
a processor, and
a memory including computer program code; the memory and the computer program code configured to, with the processor, cause the apparatus to perform energy saving management for a source cell in a communication network by
obtaining performance data of the source cell and a plurality of neighbor cells;
determining and feeding input variable values to an energy saving management function based on the performance data and a network topology of the communication network, wherein the input variable values comprise variables representative of:
an overlap between the source cell and the plurality of neighbor cells,
a neighbor cell throughput, and
a source cell throughput,
wherein the energy saving management function provides an output based on a combination of the input variable values, the method further comprising:
determining an energy saving mode for the source cell based on the output of the energy saving management function, wherein the determined energy saving mode selected from a group comprising at least the following three alternatives:
no shutdown, wherein the source cell is not shut down at all for energy saving purposes;
a shutdown according to a default plan, wherein the source cell is scheduled for shutdown during default hours; and
a shutdown according to a cell specific plan, wherein the source cell is scheduled for shutdown according to an individual plan.

13. A non-transitory memory medium comprising computer executable program code which when executed by a processor causes an apparatus to perform energy saving management for a source cell in a communication network by:
obtaining performance data of the source cell and a plurality of neighbor cells;

determining and feeding input variable values to an energy saving management function based on the performance data and a network topology of the communication network, wherein the input variable values comprise variables representative of:
an overlap between the source cell and the plurality of neighbor cells,
a neighbor cell throughput, and
a source cell throughput,
wherein the energy saving management function provides an output based on a combination of the input variable values, the method further comprising:
determining an energy saving mode for the source cell based on the output of the energy saving management function, wherein the determined energy saving mode is one of the following:
no shutdown, wherein the source cell is not shut down at all for energy saving purposes;
a shutdown according to a default plan, wherein the source cell is scheduled for shutdown during default hours; and
a shutdown according to a cell specific plan, wherein the source cell is scheduled for shutdown according to an individual plan.

14. The apparatus of claim 12, wherein values of the input variable values comprise values representative of the following:
an average overlap between the source cell and the plurality of neighbor cells,
an average neighbor cell throughput,
a minimum neighbor cell throughput, and
a source cell throughput.

15. The apparatus of claim 14, wherein the energy saving management function is a membership function having states low, medium and high,
wherein the energy saving mode is determined according to the following rules:
when the overlap is mainly low or medium, the average neighbor cell throughput is mainly medium or high, and the source cell throughput is mainly high, the energy saving mode is shutdown according to the cell specific plan;
when the overlap is mainly low or medium, the minimum neighbor cell throughput is mainly medium or high, and the source cell throughput is mainly high, the energy saving mode is shutdown according to the cell specific plan;
when the average neighbor cell throughput or the minimum neighbor cell throughput is mainly low, and the overlap is mainly medium or high, the energy saving mode is no shutdown;
when the source cell throughput is mainly low, the energy saving mode is no shutdown;
when the minimum neighbor cell throughput is mainly low, the average neighbor cell throughput is mainly high, and the overlap is mainly medium or high, the energy saving mode is shutdown according to the default plan;
when the minimum neighbor cell throughput is mainly low, the average neighbor cell throughput is mainly medium or high, and overlap is mainly low, the energy saving mode is shutdown according to the cell specific plan.

* * * * *